United States Patent Office 3,254,022
Patented May 31, 1966

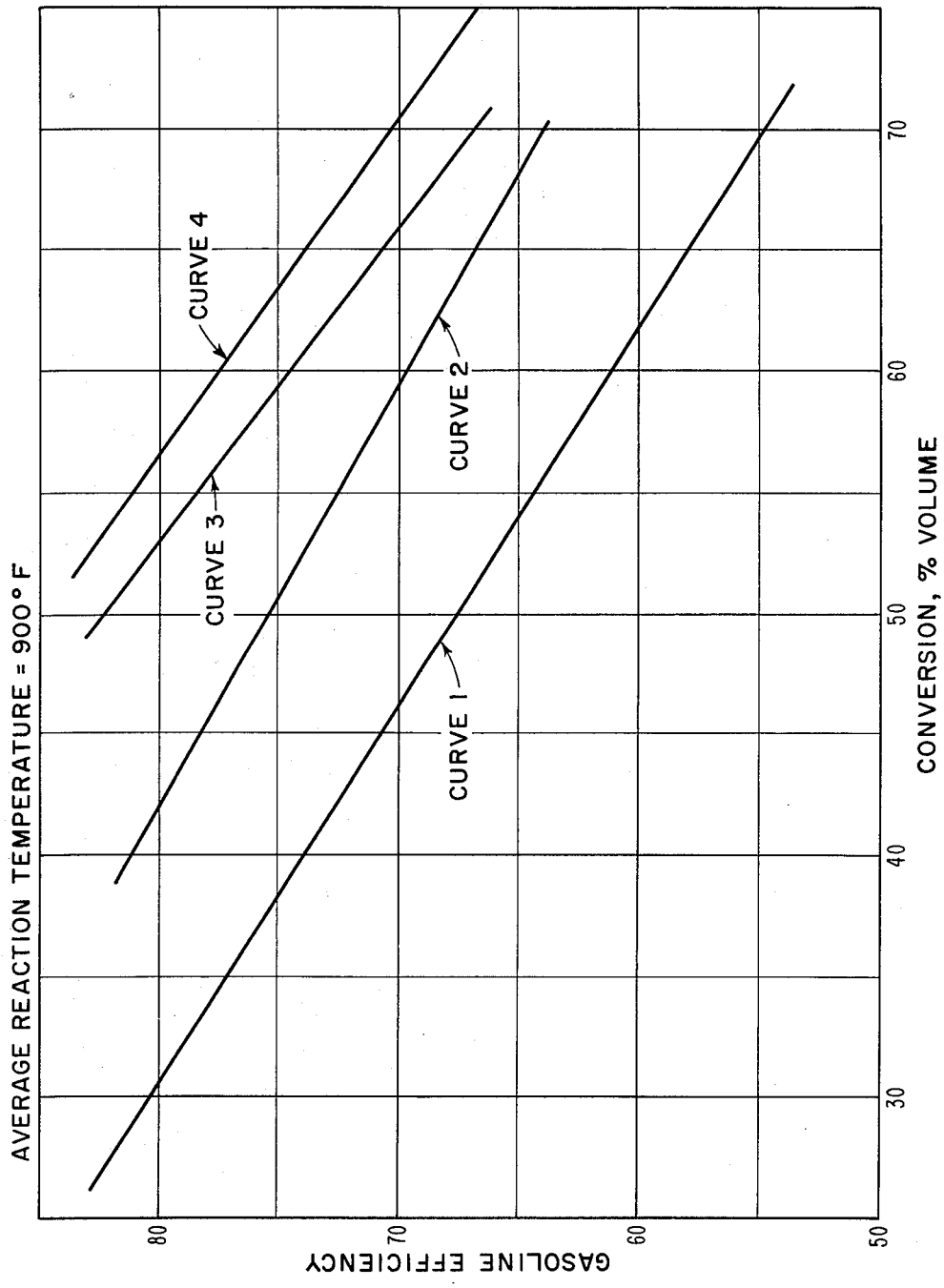

3,254,022
CATALYTIC CRACKING PROCESS WITH COUNTER-CURRENT FLOW UTILIZING A CRYSTALLINE ZEOLITE CATALYST COMPOSITE
Raymond R. Halik, Pitman Borough, and Michael T. Smilski, Mantua Township, Gloucester County, N.J., assignors to Socony Mobil Oil Company, Inc., a corporation of New York
Filed Feb. 6, 1964, Ser. No. 342,949
3 Claims. (Cl. 208—120)

This invention relates to improvements in catalytic reactions of hydrocarbons. More particularly the invention is concerned with catalytic cracking of hydrocarbons conducted in the presence of highly active catalysts.

The tremendous over-all advancement which resulted from the development of catalytic cracking was found to be so beneficial to the petroleum industry that gigantic installations have been built during the past twenty-five years at a cost running into hundreds of millions of dollars.

Like so many advancements in the scientific field, catalytic cracking had not only its many economic advantages, but it also posed many problems, some of which have withstood constant attacks and have been recognized and accommodated in the commercial cracking systems as ultimately constructed.

Much research in the art of the catalytic cracking of petroleum has been done in connection with the improvement of the catalyst per se. In this connection, those skilled in the art have been accustomed to expect important but relatively minor advances in the efficiency of catalysts. As distinguished from the type of advances which the art has been accustomed to expect, research with respect to catalysts during the recent past has uncovered a break-through totally unexpected and unpredicted which opens up a vast field in which the catalysts included therein have a relative activity of as high as ten thousand times that of the presently used catalysts. The present invention involves the use of such superactive catalysts in the cracking of petroleum hydrocarbons.

In the catalytic cracking of feed stocks utilizing silica-alumina catalysts it has been conventional to use concurrent operation of the catalyst and the feed stock. In concurrent operation, hot regenerated catalyst entering the reactor immediately contacts the charge and is reduced rather quickly to average reactor temperature. In countercurrent operation, hot regenerated catalyst at the top of the bed meets the effluent from the cracking processes accomplished further down in the bed in the reactor and it would be reasonable to believe that with superactive catalysts, a conversion of the desirable products of cracking to undesirable products would occur. Thus, it was considered that the conversion efficiency or ratio of gasoline produced to total conversion would be less with countercurrent operation because of a greater production of fixed gases and coke from secondary cracking of the products of the primary cracking reaction.

According to the present invention, it has now been discovered that contrary to previous belief, improved results are obtained when cracking feed stocks with superactive alumino-silicate catalysts under certain specific conditions when countercurrent operation is utilized.

As indicated in United States Patent 3,140,251, new superactive catalysts have been discovered which have a relative activity of as high as 10,000 times that of presently used catalysts in the cracking of hydrocarbons. Although technology is not now available for achieving full use of these catalysts, it has been found that these materials exhibit product selectivity which is extremely attractive, since the ratio of gasoline yield to coke make in gas oil cracking has been found to be markedly greater than that of conventional catalysts.

Crystalline aluminosilicates are materials of ordered internal structure in which atoms of alkali metal, alkaline earth metal or metals in replacement thereof, silicon, aluminum and oxygen are arranged in a definite and consistent crystalline or ordered pattern. Such structure contains a large number of small cavities, interconnected by a number of still smaller channels. These cavities and channels are precisely uniform in size. The interstitial dimensions of openings in the crystal lattice limit the size and shape of the molecules that can enter the interior of the aluminosilicate and it is such characteristic of many crystalline zeolites that has led to their designation as "molecular sieves."

Zeolites having the above characteristics include both natural and synthetic materials, for example, chabazite, gmelinite, mesolite, ptiliolite, mordenite, natrolite, nepheline, sodalite, scapolite, lazurite, leucrite, and cancrinite. Synthetic zeolites may be of the A type, X faujasite type, Y faujasite type, T type or other well known form of molecular sieve, including ZK zeolites such as those described in copending application Serial No. 134,841, filed August 30, 1961. Preparation of the above type zeolites is well known, having been described in the literature, for example A type zeolite in U.S. 2,882,243; X faujasite type zeolite in U.S. 2,882,244; other types of materials in Belgium Patent No. 577,642 and in U.S. 2,950,952. As initially prepared, the metal of the alumino-silicate is an alkali metal and usually sodium. Such alkali metal is subject to base-exchange with a wide variety of other metal ions. The molecular sieve materials so obtained are unusually porous, the pores having highly uniform molecular dimensions, generally between about 3 and possibly about 15 angstrom units in diameter. Each crystal of molecular sieve material contains literally billions of tiny cavities or cages interconnected by channels of unvarying diameter. The size, valence and amount of the metal ions in the crystal can control the effective diameter of the interconnecting channels.

At the present time, there are commercially available materials of the A series and of the X faujasite series. A synthetic zeolite known as "Molecular Sieve 4A" is a crystalline sodium alumino-silicate having channels of about 4 Angstroms in diameter. In the hydrated form, this material is chemically characterized by the formula:

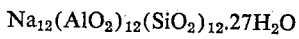

$$Na_{12}(AlO_2)_{12}(SiO_2)_{12}.27H_2O$$

The synthetic zeolite known as "Molecular Sieve 5A" is a crystalline aluminosilicate salt having channels about 5 angstroms in diameter and in which substantially all of the 12 ions of sodium in the immediately above formula are replaced by calcium, it being understood that calcium replaces sodium in the ratio of one calcium for two sodium ions. A crystalline sodium aluminosilicate having pores approximately 10 angstroms in diameter is also available commercially under the name of "Molecular Sieve 13X." The letter X is used to distinguish the interatomic structure of this zeolite from that of the A crystals mentioned above. As prepared, the 13X material contains water and has the unit cell formula:

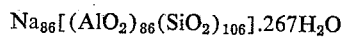

$$Na_{86}[(AlO_2)_{86}(SiO_2)_{106}].267H_2O$$

The 13X crystal is structurally identical with faujasite, a naturally occurring zeolite. The synthetic zeolite known as "Molecular Sieve 10X" is a crystalline aluminosilicate salt having channels about 10 Angstroms in diameter and in which a substantial proportion of the sodium ions of the 13X material have been replaced by calcium.

Molecular sieves of the X faujasite series are characterized by the formula:

$$\frac{M_{86}}{n}[(AlO_2)_{86}(SiO_2)_{106}] \cdot 267H_2O$$

where M is Na+, Ca++ or other metal ions introduced by replacement thereof and $n$ is the valence of the cation M. The structure consists of a complex assembly of 192 tetrahedra in a large cubic unit cell 24.95 A on an edge. Both the so-called X and the so-called Y type crystalline aluminosilicates are faujasites and have essentially identical crystal structures. They differ from each other only in that type Y aluminosilicate has a higher $SiO_2/Al_2O_3$ ratio than the X type aluminosilicate.

The alkali metal generally contained in the naturally occurring or synthetically prepared zeolites described above may be replaced to the extent disclosed by other metal ions such as ions of the oxidation influencing metals or transition metals. Replacement is suitably accomplished by contacting the initially formed crystalline aluminosilicate with a solution of an ionizable compound of the metal ion which is to be zeolitically introduced into the molecular sieve structure for a sufficient time to bring about the extent of desired introduction of such ion. After such treatment, the ion exchanged product is water washed, dried and calcined. The extent to which exchange takes place can be controlled. It is essential that the aluminosilicate undergoing activation be a metal containing aluminosilicate.

Naturally occurring or synthetic crystalline aluminosilicates may be treated to provide the superactive aluminosilicates employed in this invention by several means, such as base exchange to replace the sodium with rare earth metal compounds, by base exchange with ammonium compounds followed by heating to drive off $NH_3$ ions, leaving an H or acid form of aluminosilicates, by treatment with mineral acid solutions to arrive at a hydrogen or acid form, and by other means. These treatments may be followed by activity adjusting treatments, such as steaming, calcining, dilution in a matrix and other means. Explanation of the methods of preparing such catalysts is made in United States Patent 3,140,251 and others.

The catalyst described herein may be used in catalytic cracking operations such as a compact moving bed or in a fluidized operation. The general operating conditions cover a wide range. Thus, temperatures may vary over an approximate range of 550–1100° F., preferably 700–950° F. under pressures ranging from subatmospheric pressure up to several hundred atmospheres. Other parameters of cracking operations are space velocity and catalyst to oil ratio. These may be expressed upon either a volume or a weight basis. Upon a volume basis LHSV is defined as cubic feet of liquid oil at 60° F. charged per hour per cubic foot of reactor occupied by catalyst. Catalyst to oil ratio upon a volume basis is the cubic feet of catalyst charged to the reactor per hour divided by the cubic feet of oil (60° F.) charged to the reactor per hour. Volume basis ratios are normally used in speaking of moving bed operations while weight basis ratios are more appropriate for fluidized operations. Conversion from one basis to another may be made readily.

It should be noted that the catalysts used in this invention may be a composite of the superactive aluminosilicate and a relatively inert matrix material, or it may consist only of the superactive catalyst. If the catalyst consists of a composite, it may be produced in the form of pellets or beads. The matrix material may be any hydrous oxide gel, clay or the like. The matrix material used must have a high porosity in order that the reactants may obtain access to the active component in the catalyst composite. A high porosity matrix of the hydrous oxide type may be used in these composite catalysts, such as silica-alumina complexes, silica-magnesia, silica gel, high porosity clay, alumina, and the like.

The pellets or beads of the composite catalyst may be prepared by dispersing the aluminosilicate in an inorganic oxide sol according to the method described in U.S. Patent No. 2,900,399 and converted to a gelled bead according to the method described in U.S. Patent No. 2,384,946.

The crystalline aluminosilicate material must have a pore size or intracrystalline aperture or channel size sufficiently great to admit desired reactants. 5 A. is approximately the minimum pore size so acceptable.

The composite may contain from 5–95% of the matrix material. The superactive material may be of any activity ranging downward to an alpha value (Journal of Catalysis, vol. 4, No. 4, August 1965, pages 527–529) of about 10 for composites having higher concentrations of superactive material.

Comparative tests have been conducted to show the results obtained in the catalytic cracking of a given stock feed under similar conditions of operation except for countercurrent flow being substituted for concurrent flow. Contrary to expectations it has been found that when using a superactive aluminosilicate catalyst that has reached its equilibrium activity, that better results are obtained in terms of selectivity when using countercurrent flow than when using concurrent flow.

The tests were conducted at reactor average temperatures of from 800–1000° F. with an average temperature of 840–950° F. preferred; a space velocity of 1 to 10 vol./hr. vol. with a preferred space velocity of 2–6; and a catalyst to oil ratio of 1 to 15 by vol. with a preferred ratio of 5 to 8. The recycle to fresh feed ratio was 0.1 to 1.0 vol.

The figure accompanying this specification shows a plurality of curves obtained by plotting gasoline efficiency against conversion, percent vol., for test runs using various catalysts. The curves are identified as Curve 1, Curve 2, Curve 3, and Curve 4.

Referring to the curves individually, Curve 1 shows the results obtained using both concurrent and countercurrent flow with various conventional silica alumina catalysts. This curve shows that there is no significant difference noticed between concurrent and countercurrent flow when using conventional catalysts.

Curves 2 and 3 are particularly significant. Curve 2 relates to concurrent flow and Curve 3 relates to countercurrent flow when using a superactive aluminosilicate catalyst which has reached its equilibruim activity. The catalysts were in bead form of 4–10 Tyler screen mesh size having 20–23 diffusivity level. The superactive aluminosilicate was a rare earth exchanged X type faujasite aluminosilicate ion-exchanged to a sodium content of les than 1% (wt.), steamed for 10 hours at 1300° F. and was incorporated to the extent of about 7.5% by weight into a silica alumina matrix.

Equilibrium catalyst is defined as a catalyst which, after repeated use and regeneration, has settled down to an activity level which thereafter does not undergo substantial or rapid change. This term is familiar to those skilled in the art of catalytic conversions.

These curves show that countercurrent flow gives better gasoline cracking efficiency (selectivity) than concurrent flow. For example, at a conversion rate of 60%, countercurrent flow yielded a gasoline efficiency of approximately 75 as compared to a gasoline efficiency of approximately 70 for concurrent flow using the same conditions of operation using the same equilibrium superactive catalysts.

Curve 4 shows the results obtained in both countercurrent and concurrent flow using fresh superactive aluminosilicate catalyst. It is interesting to note that there appears to be no advantage to using the countercurrent flow over concurrent flow when dealing with fresh catalyst. The advantage appears as shown in Curves 2 and 3 after equilibrium activity is reached.

The reasons why better results are obtained with countercurrent flow when cracking with equilibrium aluminosilicate beads is not known for certain. However, it is believed that the advantage results from the removal of impurities from the vaporized charge stock by the spent catalyst thereby allowing the major portion of the cracking to take place in the presence of a clean stock and clean catalyst. It is also thought that repeated adsorption-desorption of the more refractive hydrocarbons by the downflowing catalyst in the stream of upflowing vapors provides a longer residence time for the oil in the reactor than in a concurrent flow system at the same space velocity conditions.

As an indication of the operating conditions involved in these various modes of conversion, it may be noted that at 900° F. and a catalyst/oil (v./v.) ratio of 4 the following approximate conversions may be experienced:

| Catalyst | Flow | Space Velocity | Conversion | Gaso/Conv., Percent |
|---|---|---|---|---|
| Si-Al | Concurrent | 2 | 38 | 75 |
| Si-Al | Countercurrent | 2 | 52 | 56 |
| Super [1] | Concurrent | 2 | 61 | 69 |
| Super [1] | Countercurrent | 2 | 72 | 69 |

[1] Superactive aluminosilicate in silica-alumina matrix, used in developing curves 2 and 3 of Figure 1.

From the above it may be noted that wtih silica-alumina catalyst currently in wide use, changing from one flow to another yields no essential change in gasoline production, but materially increases loss to less valuable materials, by decrease in the gasoline/conversion ratio.

On the other hand, changing the flow with an equilibrium superactive aluminosilicate catalytic material does not sacrifice selectivity and gives a net increase in gasoline.

The present catalytic cracking process is particularly adapted for use with a moving bed TCC system for making primarily high octane gasoline and distillate fuel fractions from full range gas oils.

Although the present invention has been described in conjunction with preferred embodiments, it is to be understood that modifications and variations may be resorted to, without departing from the spirit and scope thereof, as those skilled in the art will readily understand. Such variations and modifications are considered to be within the purview and scope of the appended claims.

What is claimed is:

1. A process for the conversion of gas oil to gasoline with reduction in amount of products of conversion other than gasoline which comprises:

subjecting a solid, porous, superactive crystalline aluminosilicate catalyst to repeated cycles of contact with gas oil under cracking conditions and to regeneration until it has reached a condition of substantial equilibrium activity, thereafter flowing gas oil charge through a reactor vessel in countercurrent contact with said equilibrium catalyst to achieve conversion at a gasoline efficiency greater than would be experienced with concurrent flow, removing the catalyst from the reactor, regenerating the catalyst, and returning it to the reactor.

2. A process in accordance with claim 1, wherein said superactive crystalline aluminosilicate catalyst is present to the extent of at least 5% in composite with a matrix material of substantially less activity.

3. A process in accordance with claim 1, wherein said superactive crystalline aluminosilicate catalyst is present to the extent of at least 5% in composite with a matrix material which is substantially inert for cracking.

References Cited by the Examiner

UNITED STATES PATENTS

| | | | |
|---|---|---|---|
| 2,448,922 | 9/1948 | Simpson et al. | 208—166 |
| 2,520,983 | 9/1950 | Wilcox | 208—164 |
| 2,560,343 | 7/1951 | Hemminger | 208—165 |
| 3,140,251 | 7/1964 | Plank et al. | 208—120 |

DELBERT E. GANTZ, *Primary Examiner.*

A. RIMENS, *Examiner.*